US009126556B2

(12) United States Patent
Sakaguchi et al.

(10) Patent No.: US 9,126,556 B2
(45) Date of Patent: Sep. 8, 2015

(54) AIR-BAG MODULE MOUNTING STRUCTURE

(71) Applicants: Shogo Sakaguchi, Tokyo (JP); Hiroki Takehara, Tokyo (JP)

(72) Inventors: Shogo Sakaguchi, Tokyo (JP); Hiroki Takehara, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 14/423,717

(22) PCT Filed: Aug. 28, 2013

(86) PCT No.: PCT/JP2013/073001
§ 371 (c)(1),
(2) Date: Feb. 25, 2015

(87) PCT Pub. No.: WO2014/042008
PCT Pub. Date: Mar. 20, 2014

(65) Prior Publication Data
US 2015/0210239 A1   Jul. 30, 2015

(30) Foreign Application Priority Data

Sep. 12, 2012   (JP) .................. 2012-200856

(51) Int. Cl.
*B60R 21/203*   (2006.01)
(52) U.S. Cl.
CPC ........... *B60R 21/203* (2013.01); *B60R 21/2037* (2013.01)
(58) Field of Classification Search
CPC .......................... B60R 21/203; B60R 21/2037
See application file for complete search history.

(56) References Cited

U.S. PATENT DOCUMENTS

| 5,577,779 | A  | * | 11/1996 | Dangel ........................... 292/80 |
| 5,593,178 | A  | * | 1/1997  | Shiga et al. ................... 280/731 |
| 5,738,369 | A  | * | 4/1998  | Durrani ......................... 280/731 |
| 7,097,197 | B2 | * | 8/2006  | Keutz et al. ............... 280/728.2 |
| 8,042,830 | B2 | * | 10/2011 | Hagelgans et al. ........ 280/728.2 |
| 8,087,691 | B2 | * | 1/2012  | Nebel et al. ................... 280/731 |
| 9,027,960 | B1 | * | 5/2015  | Yoshida ........................ 280/731 |
| 2011/0248481 | A1 |   | 10/2011 | Amamori et al. |
| 2012/0098241 | A1 | * | 4/2012  | Nebel ........................... 280/741 |
| 2014/0145420 | A1 | * | 5/2014  | Amamori ...................... 280/731 |

FOREIGN PATENT DOCUMENTS

| JP | H08-192755 | 7/1996 |
| JP | H09-207693 | 8/1997 |

(Continued)

OTHER PUBLICATIONS

International Search Report mailed on Dec. 3, 2013.

*Primary Examiner* — Paul N Dickson
*Assistant Examiner* — Darlene P Condra
(74) *Attorney, Agent, or Firm* — IPUSA, PLLC

(57) ABSTRACT

An air-bag module mounting structure where a fixing part 88 of a hub 80 of a steering wheel is fastened to a fastened part 24 of a horn plate 20 to which an air-bag module is fixed. A body cover 30 includes a positioning pin 31 protruding toward the hub 80 and a hook 38 protruding from a side surface 37 of the positioning pin 31. The hub 80 includes an insertion hole 84 into which the positioning pin 31 is inserted and with which the hook 38 engages; and a stopper 87 that prevents the horn plate 20 from moving, because of a gap d2 existing between the insertion hole 84 and the positioning pin 31, when the fixing part 88 and the fastened part 24 are fastened together. The gap d2 allows the positioning pin 31 to pass through the insertion hole 84 while the positioning pin 31 is bent due to a contact between the hook 38 and the insertion hole 84.

6 Claims, 12 Drawing Sheets

(56) References Cited

FOREIGN PATENT DOCUMENTS

| JP | 2001-354100 | 12/2001 |
| JP | 2002-264759 | 9/2002 |
| JP | 2010-241364 | 10/2010 |
| JP | 2011-213250 | 10/2011 |
| WO | 2010/064488 | 6/2010 |

* cited by examiner

AIR-BAG MODULE MOUNTING STRUCTURE

TECHNICAL FIELD

The present invention relates to a structure for mounting an air-bag module on a steering wheel.

BACKGROUND ART

For example, Patent Document 1 is known as a related-art document regarding a structure for mounting an air-bag module on a steering wheel.

RELATED-ART DOCUMENT

Patent Document

[Patent Document 1] Japanese Laid-Open Patent Publication No. 2010-241364

DISCLOSURE OF INVENTION

Problems to be Solved by the Invention

For an air-bag module mounting structure as described above, it is desired to be able to accurately position an air-bag module relative to a steering wheel. For example, when a side of a spoke of a steering wheel facing a driver is made of a hard part that is comparatively harder than an elastic cover material covering the steering wheel, it is possible to accurately position an air-bag module by providing a positioning function using such a hard part.

However, in a case of a vehicle where a spoke does not include such a hard part, it is necessary to position an air-bag module using an elastic cover part of the spoke, and therefore it is difficult to accurately position the air-bag module relative to a steering wheel.

To obviate such a problem, a protruding part may be provided on a cover part at the back of a hub located in the center of a steering wheel such that the protruding part protrudes toward the hub, and a positioning function may be provided by the protruding part. However, because such a cover part and an air-bag module are distant from each other, the length of the protruding part providing the positioning function needs to be long, and it is difficult to accurately position the air-bag module relative to the steering wheel.

One objective of the present invention is to provide an air-bag module mounting structure that can accurately position an air-bag module relative to a steering wheel.

Means for Solving the Problems

To achieve the above objective, the present invention provides an air-bag module mounting structure that includes a steering wheel including a hub disposed inside of an annular rim, an air-bag module disposed in front of the hub, a holding part to which the air-bag module is fixed, and a cover part disposed at the back of the hub, a fixing part of the hub and a fixed part of the holding part being fastened together. The cover part includes a protruding part protruding toward the hub, a hook protruding from a side surface of the protruding part, and a cover-side connection part formed on a head of the protruding part. The holding part includes a holding-part-side connection part that is connected to the cover-side connection part. The hub includes an insertion hole into which the protruding part is inserted and with which the hook engages, and a stopper that prevents the holding part from moving, because of a gap existing between the insertion hole and the protruding part, when the fixing part and the fixed part are fastened together. The gap allows the protruding part to pass through the insertion hole while the protruding part is bent due to a contact between the hook and the insertion hole.

Advantageous Effect of the Invention

One aspect of this disclosure makes it possible to accurately position an air-bag module relative to a steering wheel.

DESCRIPTION OF EMBODIMENTS

Embodiments of the present invention are described below with reference to the accompanying drawings.

<Configuration of Air-Bag Module Mounting Structure>

Figure 1:
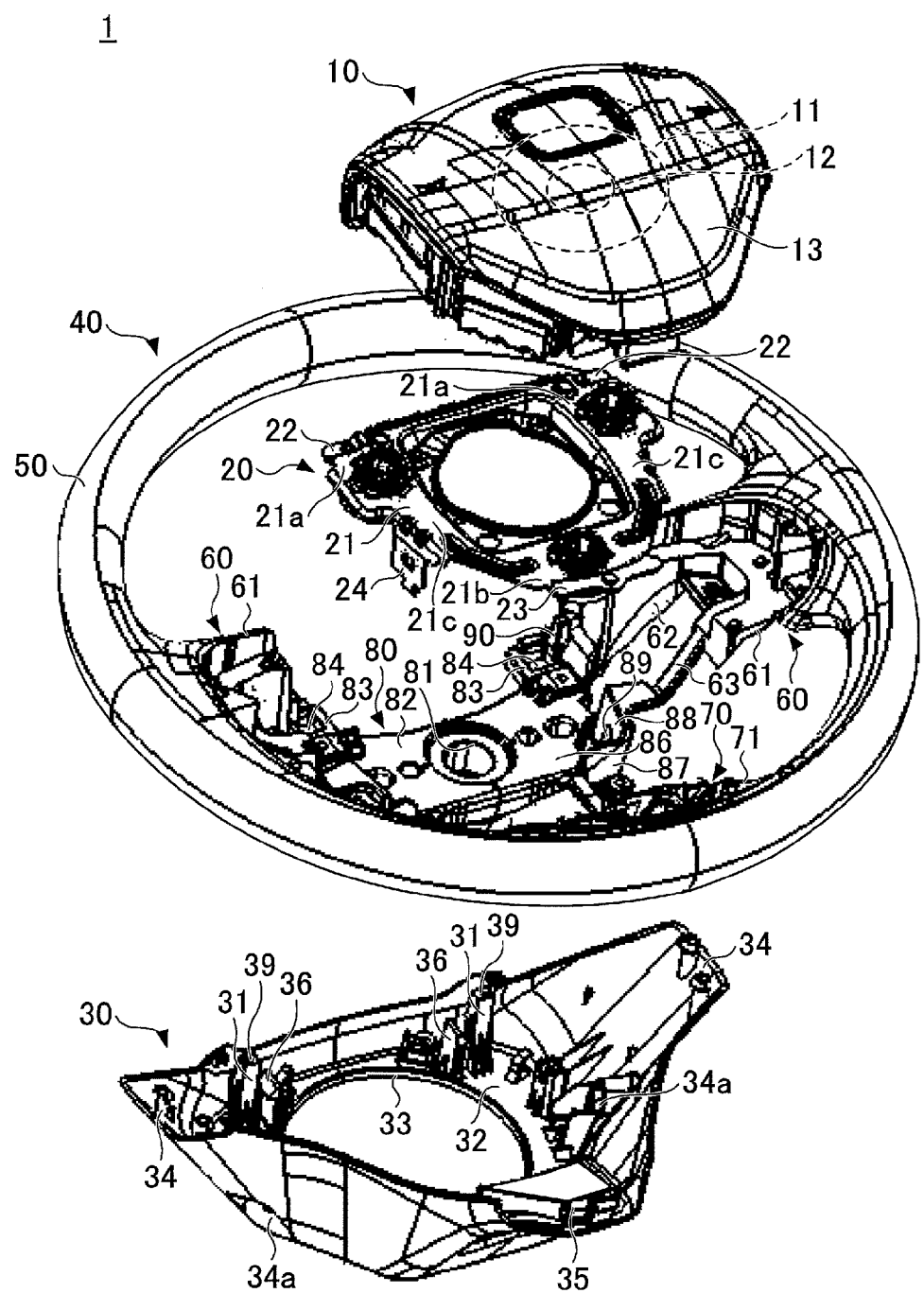
FIG. 1 is an exploded view of an exemplary steering device including an air-bag module mounting structure.
Figure 2:
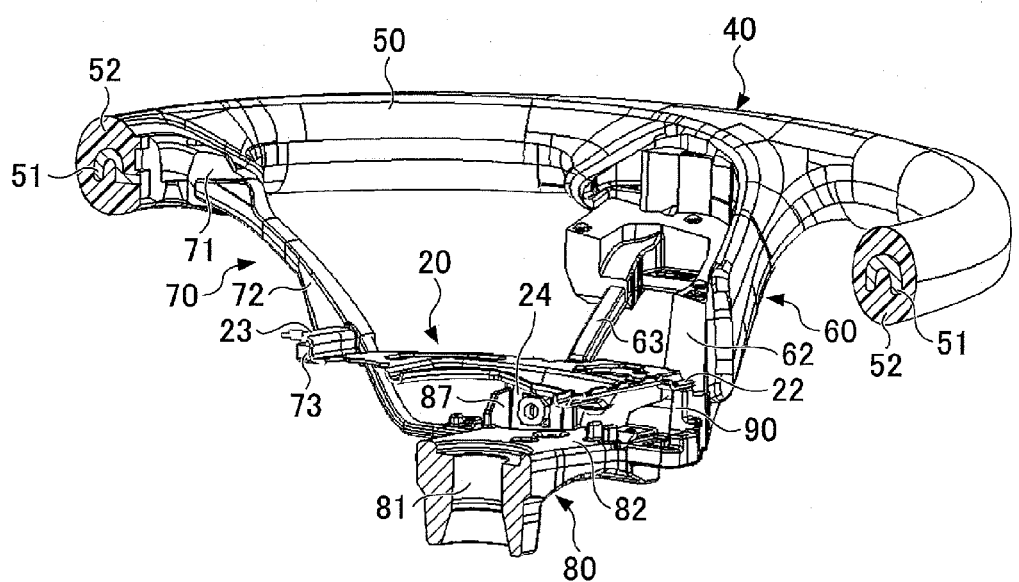
FIG. 2 is a cut-away perspective view of a steering device.
Figure 3:
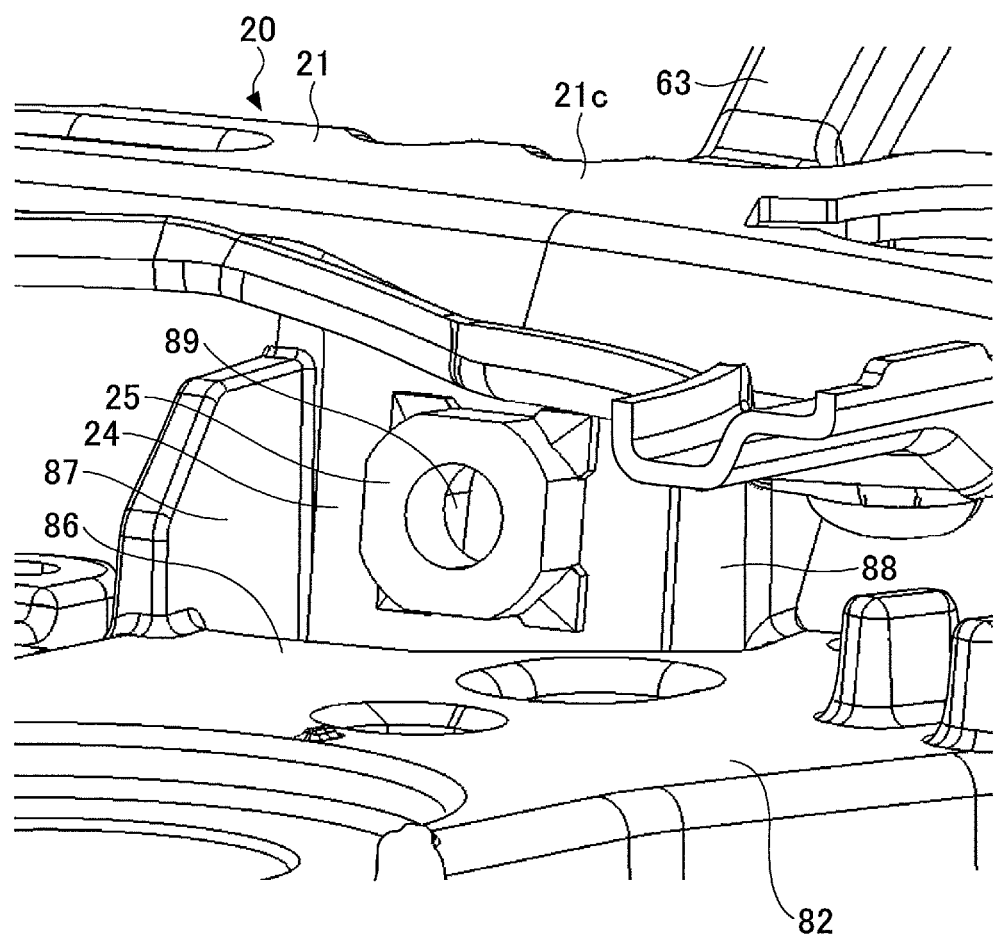
FIG. 3 is an enlarged view of a part of FIG. 2.

FIG. 1 is an exploded view of a steering device 1 including an air-bag module mounting structure according to an embodiment of the present invention. FIG. 2 is a cut-away perspective view of the steering device 1. FIG. 3 is an enlarged view of a part of FIG. 2. As illustrated by FIG. 1, the steering device 1 includes a steering wheel 40, an air-bag module 10, a horn plate 20, and a body cover 30.

The steering wheel 40 includes, for example, a rim 50, a hub 80, horizontal spokes 60, and a lower spoke 70. As illustrated by FIG. 2, the rim 50, the horizontal spokes 60, and the lower spoke 70 are formed by covering a core (metal core) 51 with an elastic skin part 52. For example, the hub 80 and the core 51 are comprised of a metal such as a magnesium alloy or an aluminum alloy, and the skin part 52 is comprised of a resin material such as a polyurethane resin that is softer than the core 51. The hub 80 is not covered by the skin part 52 such that the core (metal core) 51 is exposed. A part of the hub 80 that does not influence the accuracy of positioning the air-bag module 10 may be covered by the skin part 52.

As illustrated in FIG. 1, the rim 50 is an annular part that is held by a driver, and may have a circular shape or any other ring shape such as an oval shape.

The hub 80 is disposed in a central region of the annular rim 50. A steering shaft (not shown) of a vehicle is attached to the hub 80. Also, the horn plate 20, to which the air-bag module 10 is fixed, is attached to the hub 80. The hub 80 is located inside of the rim 50, and is offset from the rim 50 toward the steering shaft (in a direction away from the driver).

The hub 80 includes a hub body 82 having a substantially rectangular plate shape when seen in the direction of the central axis of the steering wheel 40. A shaft hole 81, into which the steering shaft is to be inserted, is formed in a center portion of the hub body 82.

The hub 80 includes fixing parts 88 to which fastened parts 24 of the horn plate 20 are fastened and fixed. The fixing parts 88 are formed at vehicle-lower-side corners of right and left side parts of the hub body 82 so as to protrude toward the air-bag module 10. A pair of right and left fixing parts 88, having a substantially rectangular plate shape, are formed in the present embodiment. Each fastened part 24 is fixed to the corresponding fixing part 88 such that an outer surface of the fastened part 24, which faces the inner periphery of the rim 50, is in contact with an inner surface of the fixing part 88.

A slot 89, into which a bolt (not shown) is inserted, is formed through each fixing part 88. The horn plate 20 is fixed to the fixing part 88 of the hub by screwing the bolt into a fixing nut 25 of the fastened part 24.

A pair of right and left horizontal spokes 60 extending toward the inside of the steering wheel 40 are formed in the present embodiment. The horizontal spokes 60 connect the right and left side parts of the hub body 82 with inner peripheral parts of the rim 50 that are adjacent to the right and left side parts of the hub body 82. Each horizontal spoke 60 includes a rim-side base part 61 that extends inward in a radial direction from the inner periphery of a right or left part of the rim 50, and connecting parts 62 and 63 that connect an end (which is closer to the hub 80) of the rim-side base part 61 and a side part of the hub body 82. The connecting parts 62 and 63 are formed to protrude from the side part of the hub body 82 toward the driver side, and ends of the connecting parts 62 and 63 closer to the driver side are connected to the rim-side base part 61.

The lower spoke 70 extends toward the inside of the steering wheel 40. One lower spoke 70 is provided in this example. The lower spoke 70 connects a lower end part of the hub body 82 and an inner peripheral part of the rim 50 that is adjacent to the lower end part of the hub body 82. The lower spoke 70 includes a rim-side base part 71 that extends inward (upward) in a radial direction from the inner periphery of a lower part of the rim 50, and connecting parts 72 that connect an end (which is closer to the hub 80) of the rim-side base part 71 and the lower end part of the hub body 82. The connecting parts 72 are formed to protrude from the lower end part of the hub body 82 toward the driver side, and ends of the connecting parts 72 closer to the driver side are connected to the rim-side base part 71.

The air-bag module 10 is an air-bag device that includes a folded air bag 11, an inflator 12 for inflating the air bag 11, and a module cover 13 for covering the air bag 11. The air-bag module 10 is attached to the horn plate 20 such that the air-bag module 10 is positioned in front of the hub 80 (i.e., positioned closer to the driver side than the hub 80).

The horn plate 20 is a holding part to which the air-bag module 10 is fixed. The horn plate 20 includes positioning pin contact parts 22 used as holding-part-side connection parts that are connected to heads 39 of positioning pins 31 of the body cover 30. The horn plate 20 also includes the fastened parts 24 used as fixed parts to be fastened to the fixing parts 88 of the hub 80. The horn plate 20 and the air-bag module 10 are fixed to each other to form a single unit. The horn plate 20 is a plate-shaped part on which a horn switch is provided. The horn switch causes a horn to make a sound when the module cover 13 of the air-bag module 10 is pressed. The horn plate 20 is formed by pressing, for example, a steel plate, and includes a frame 21, the positioning pin contact parts 22, a lower spoke contact part 23, and the fastened parts 24.

The frame 21 is disposed in a position closer to the driver side than the hub 80, and has substantially a rectangular shape. For example, the air-bag module 10 and the horn switch are fixed to the frame 21.

The positioning pin contact parts 22 are connectable to the heads 39 of the positioning pins 31 of the body cover 30, and are formed at vehicle-upper-side corners 21a of right and left side parts 21c of the frame 21. The horn plate 20 and the air-bag module 10 can be positioned relative to the positioning pins 31 by connecting the positioning pin contact parts 22 to the heads 39 of the positioning pins 31.

The lower spoke contact part 23 is a positioning surface part formed at a lower part 21b of the frame 21. For example, as illustrated in FIG. 2, the lower spoke contact part 23 contacts a positioning part 73 provided at an end, which is closer to the hub 80, of the connecting part 72 of the lower spoke 70. The horn plate 20 and the air-bag module 10 can also be positioned relative to the positioning pins 31 by bringing the lower spoke contact part 23 into contact with a driver-side mounting surface of the positioning part 73.

The fastened parts 24 are formed at the right and left side parts 21c of the frame 21 so as to protrude toward the vehicle front. A pair of fixing parts 24, having a substantially rectangular plate shape, are formed in the present embodiment. The fastened parts 24 are fastened to the fixing parts 88 of the hub 80. Each fastened part 24 includes the fixing nut 25 having an internal thread and protruding toward the central portion of the hub 80 (see FIG. 3).

As illustrated in FIG. 1, the body cover 30 is a cover part disposed at the back of the hub 80 (i.e., disposed closer to the vehicle front than the hub 80). The body cover 30 includes cover-side connection parts that are formed on the heads 39 of the positioning pins 31 and to be connected to the positioning pin contact parts 22 of the horn plate 20. The body cover 30 may be comprised of a thermoplastic resin such as polypropylene (PP), and is a back cover that covers the hub 80, the horizontal spokes 60, and the lower spoke 70 from the back side of the hub 80.

The body cover 30 includes a bottom part 32, in which a through hole 33 that allows the steering shaft (not shown) to pass through is formed, and a surrounding wall that surrounds the bottom part 32. The surrounding wall includes right and left side walls 34 that cover the back sides of the horizontal spokes 60, and a lower side wall 35 that covers the back side of the lower spoke 70. A work hole 34a is formed through each of the right and left side walls 34 in the thickness direction of the right and left side walls 34. A bolt is inserted through the work hole 34a to fasten the fixing part 88 of the hub 80 and the fastened part 24 of the horn plate 20 together with the bolt.

The body cover 30 includes the positioning pins 31 that protrude toward the hub 80. The positioning pins 31 are protruding parts for positioning the horn plate 20 to which the air-bag module 10 is fixed. The positioning pins 31 are preferably formed as integral parts of the body cover 30. When the body cover 30 is attached to the back side of the steering wheel 40, the positioning pins 31, which protrude from the bottom part of the body cover 30 toward the driver side, are inserted into insertion holes 84 formed in the hub body 82 of the hub 80.

Figure 4:
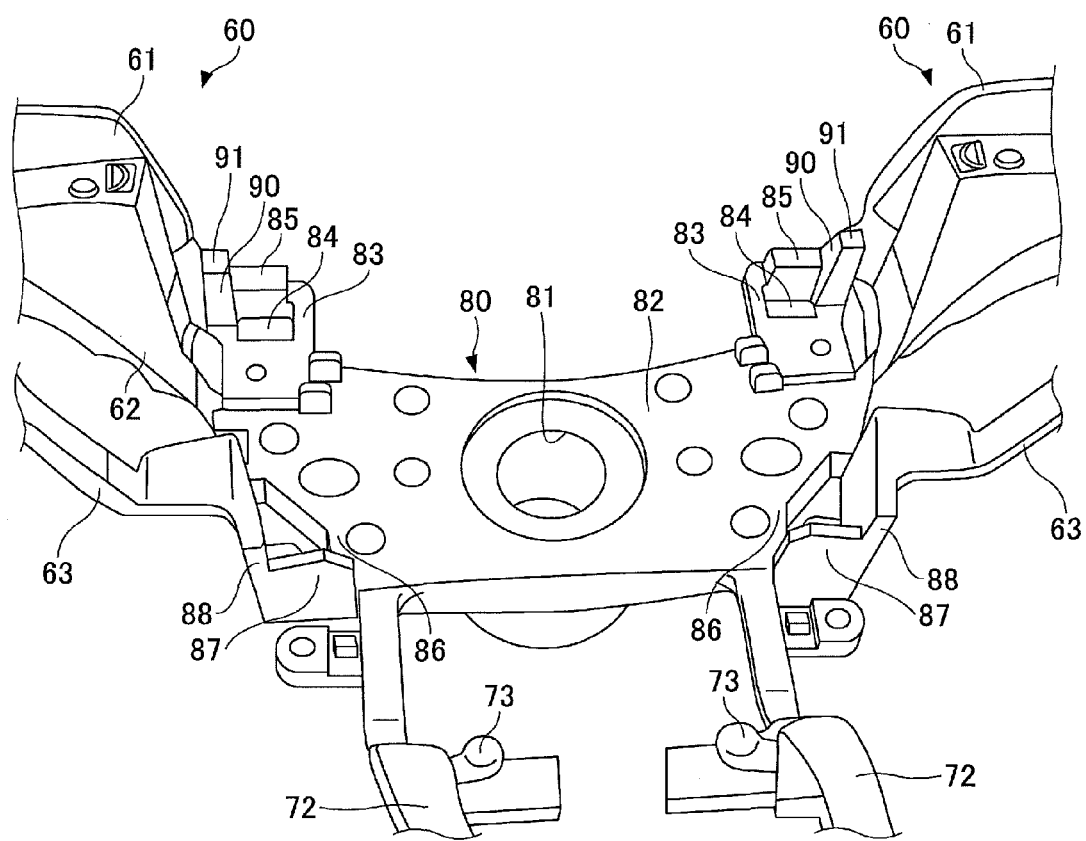
FIG. 4 is an enlarged perspective view of a part of a steering wheel.

FIG. 4 is an enlarged perspective view of a part of the steering wheel 40. The insertion holes 84 are formed through vehicle-upper-side corners of right and left side parts of the hub body 82 in the thickness direction of the hub body 82.

<Attaching Body Cover>

Figure 5:
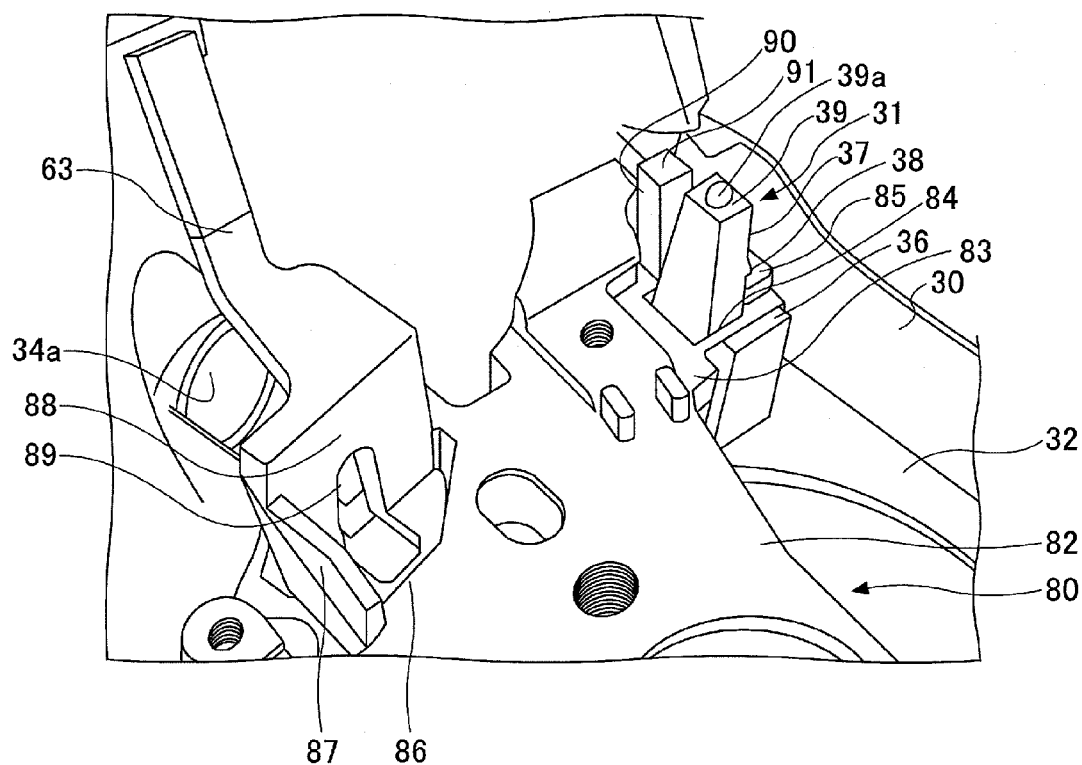
FIG. 5 is a perspective view illustrating a state where a body cover is attached from a back side of a hub.

FIG. 5 is a perspective view illustrating a state where the body cover 30 is attached to the back side of the hub 80 and the positioning pins 31 of the body cover 30 are inserted through the insertion holes 84 of the hub body 82. The body cover 30 includes hooks 36 that protrude from the bottom part 32 of the body cover 30 toward the driver side, and bend in the width direction of the vehicle toward the outside of the hub 80.

When the body cover 30 is attached to the back side of the hub 80, the hooks 36 engage with mounting surfaces 83 formed at the vehicle-upper-side corners of the right and left side parts of the hub body 82. Each mounting surface 83 is formed on the periphery of the insertion hole 84. When the hooks 36 engage with the mounting surfaces 83, the body cover 30 is fixed to the hub body 82 of the hub 80.

The body cover 30 also includes hooks 38. Each hook 38 protrudes from the middle of a side surface 37 of the positioning pin 31 toward the vehicle upper side. When the positioning pin 31 is inserted through the insertion hole 84, the hook 38 engages with the insertion hole 84 and is caught by the mounting surface around the insertion hole 84. When the hooks 38 engage with the insertion holes 84 and are caught by the mounting surfaces 83, the body cover 30 is fixed to the hub body 82 of the hub 80.

The mounting surface 83 that catches the hook may be configured to include a step 85 protruding toward the driver side. With the step 85, the thickness of a part of the hub body 82 corresponding to the mounting surface 83 is increased by the thickness of the step 85. Thus, forming the step 85 on the mounting surface 83 makes it possible to increase the strength of the part of the hub body 82 with which the hook 38 engages.

Figure 6:
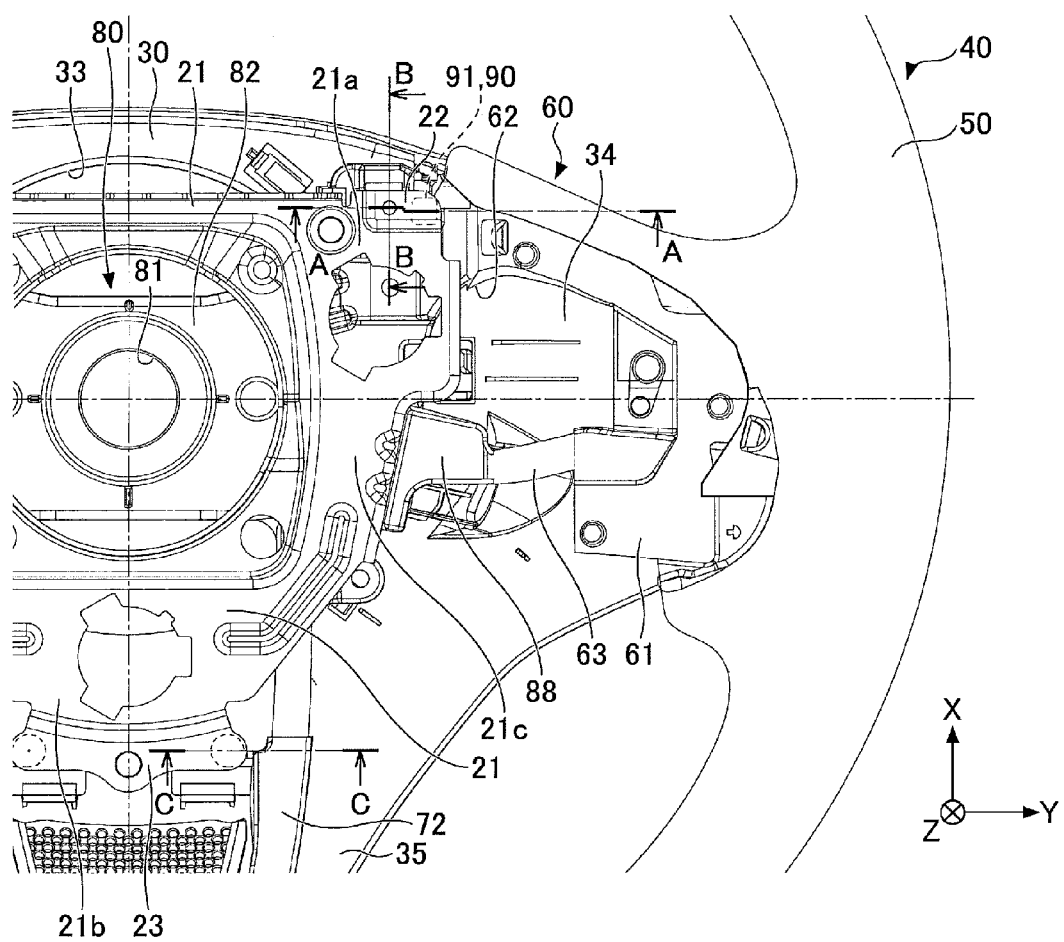
FIG. 6 is a drawing illustrating an assembly of a horn plate, a steering wheel, and a body cover.

FIG. 6 is a drawing illustrating an assembly, seen from the driver side, of the body cover 30 attached to the back side of the hub 80 of the steering wheel 40 and the horn plate 20. In FIG. 6, the air-bag module 10 is omitted. In FIG. 6, a direction parallel to the X axis is referred to as a "vehicle vertical direction", a direction parallel to the Y axis is referred to as a "vehicle width direction", and a direction parallel to the Z axis is referred to as a "vehicle length direction".

Figure 7:
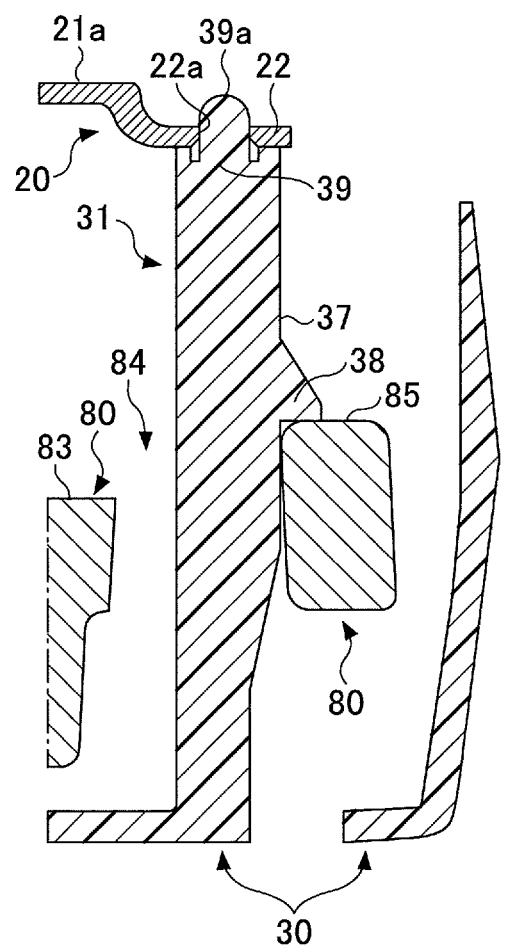
FIG. 7 is a cross-sectional view taken along line B-B of FIG. 6.

FIG. 7 is a cross-sectional view taken along line B-B of FIG. 6. The positioning pin 31 of the body cover 30 is inserted through the insertion hole 84 formed in the hub 80, and the hook 38 engages with the insertion hole 84. The positioning pin 31 includes a hemispherical protrusion 39a that is formed on the head and used as a cover-side connection part to be connected with the positioning pin contact part 22 of the horn plate 20. When the protrusion 39a is fit into a through hole 22a formed in the positioning pin contact part 22, the horn plate 20 is positioned by the positioning pin 31.

This positioning mechanism is preferably formed at each side in the vehicle width direction. One of the hooks 38 is caught by the step 85, which is a part of the mounting surface 83 of the hub 80, in a first vehicle vertical direction (e.g., upward direction), and another one of the hooks 38 is caught by the mounting surface 83 of the hub 80 in the same upward direction.

When the hooks 38 of the positioning pins 31 engage the insertion holes 84 of the hub 80, the body cover 30 is positioned in the vehicle vertical direction relative to the steering wheel 40 that is positioned via the hub 80 and the steering shaft relative to the body of the vehicle. Also, because the protrusions 39a of the positioning pins 31 positioned in the vehicle vertical direction are fitted into the through holes 22a of the horn plate 20, the horn plate 20 and the air-bag module 10 fixed to the horn plate 20 are positioned in the vehicle vertical direction relative to the steering wheel 40.

Figure 8:
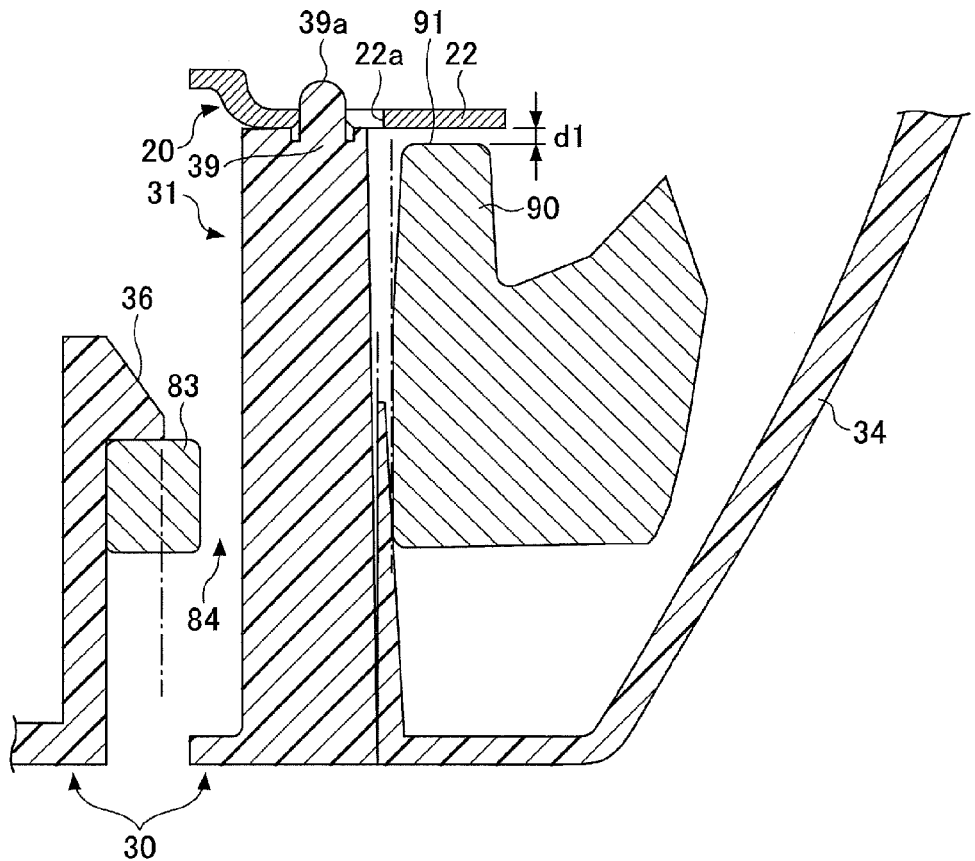
FIG. 8 is a cross-sectional view taken along line A-A of FIG. 6.

FIG. 8 is a cross-sectional view taken along line A-A of FIG. 6. The positioning pin 31 of the body cover 30 is inserted through the insertion hole 84 formed in the hub 80, and the hook 36 of the body cover 30 engages with the mounting surface 83.

This positioning mechanism is preferably formed at each side in the vehicle width direction. One of the hooks 36 is caught by the mounting surface 83 in a first vehicle width direction (e.g., rightward direction), and another one of the hooks 36 is caught by the mounting surface 83 in a second vehicle width direction (e.g., leftward direction).

Because the hooks 36 are caught by the mounting surfaces 83 in opposite directions, the body cover 30 is positioned in the vehicle width direction relative to the steering wheel 40 that is positioned via the hub 80 and the steering shaft relative to the body of the vehicle. Also, because the protrusions 39a of the positioning pins 31 positioned in the vehicle width direction are fitted into the through holes 22a of the horn plate 20, the horn plate 20 and the air-bag module 10 fixed to the horn plate 20 are positioned in the vehicle width direction relative to the steering wheel 40.

Figure 9:
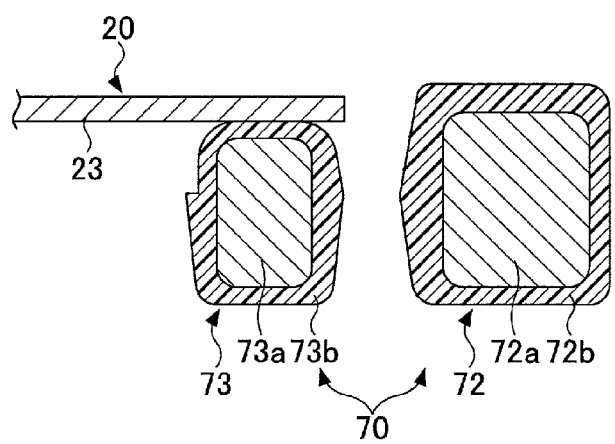
FIG. 9 is a cross-sectional view taken along line C-C of FIG. 6.

FIG. 9 is a cross-sectional view taken along line C-C of FIG. 6. The lower spoke contact part 23 of the horn plate 20 is in contact with a mount part of the positioning part 73 of the lower spoke 70. The positioning part 73 is provided at an end of each connecting part 72 of the lower spoke 70 (see FIG. 4). In FIG. 9, reference numbers 72a and 73a indicate cores (metal cores) comprised of, for example, a magnesium alloy, and reference numbers 72b and 73b indicate skin parts comprised of, for example, a polyurethane resin. The positioning part 73 is positioned by the hub 80 relative to the body of the vehicle.

Thus, the lower spoke contact part 23 is in contact with the positioning part 73 (see FIG. 9), and the protrusion 39a of the positioning pin 31 is fitted into the through hole 22a of the horn plate 20 (see FIGS. 7 and 8). This configuration makes it possible to position the horn plate 20 and the air-bag module 10 fixed to the horn plate 20 in the vehicle length direction relative to the steering wheel 40.

Figure 10:
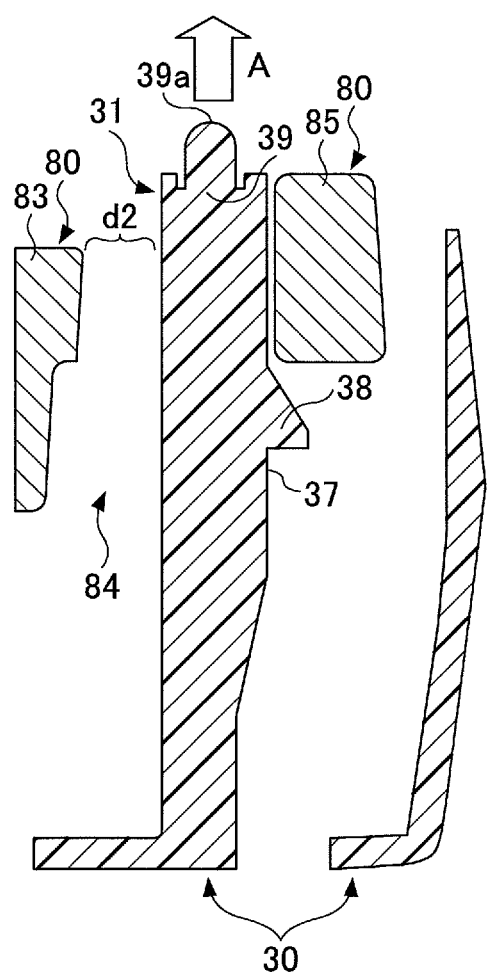
FIG. 10 is a drawing used to describe a method of fixing a body cover to a hub.
Figure 11:
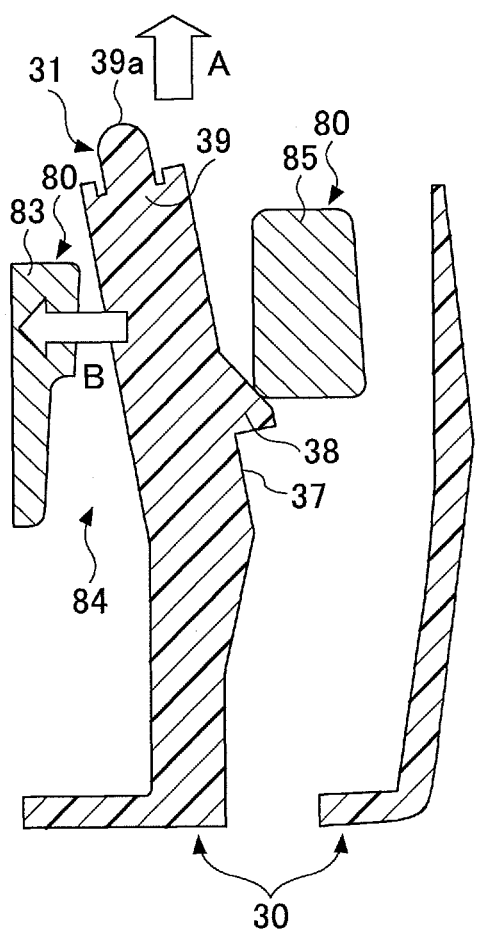
FIG. 11 is a drawing used to describe a method of fixing a body cover to a hub.
Figure 12:
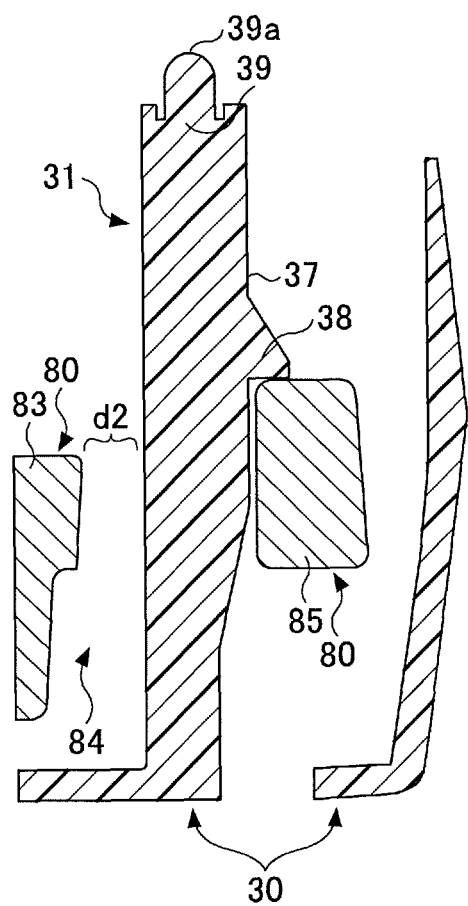
FIG. 12 is a drawing used to describe a method of fixing a body cover to a hub.

FIGS. 10, 11, and 12 are drawings used to describe a method of fixing the body cover 30 to the hub 80. First, as illustrated by FIG. 10, the body cover 30 is pressed in a direction A (toward the driver side) from the bottom side of the hub 80 such that the positioning pin 31 is inserted into the insertion hole 84. Next, as illustrated by FIG. 11, when a force is applied in the direction A, the hook 38 of the positioning pin 31 hits the inner surface of the insertion hole 84. As a result, the positioning pin 31 is bent in a direction B (in this example, a downward direction) that is a vehicle vertical direction, and the bent positioning pin 31 passes through the insertion hole 84. Then, as illustrated by FIG. 12, when the hook passes through the insertion hole 84, the bent positioning pin 31 returns to its original shape.

Here, as illustrated by FIG. 10, a gap d2 necessary for assembling exists in the direction B between the insertion hole 84 and the positioning pin 31 so that the positioning pin 31, which is bent as a result of a contact between the hook 38 and the inner surface of the insertion hole 84, is able to pass through the insertion hole 84. This gap d2, however, reduces the positioning accuracy in the direction B of the body cover 30 relative to the hub 80. As a result, the positioning accuracy of the air-bag module 10 relative to the steering wheel 40 is also reduced.

To prevent such reduction in the positioning accuracy, the hub 80 includes a first stopper 87 as illustrated in FIGS. 1, 3, 4, and 5. Providing the first stopper 87 makes it possible to accurately position the air-bag module 10 relative to the steering wheel 40. The first stopper 87 limits movement of the horn plate 20 that is allowed by the presence of the gap d2 and caused by a fastening force generated when the fastened part 24 of the horn plate 20 is fastened to the fixing part 88 of the hub 80. In the example illustrated in the figures, the first stopper 87 is a wall provided on the fixing part 88 and protrudes inward in the vehicle width direction from the fixing part 88.

Figure 13:
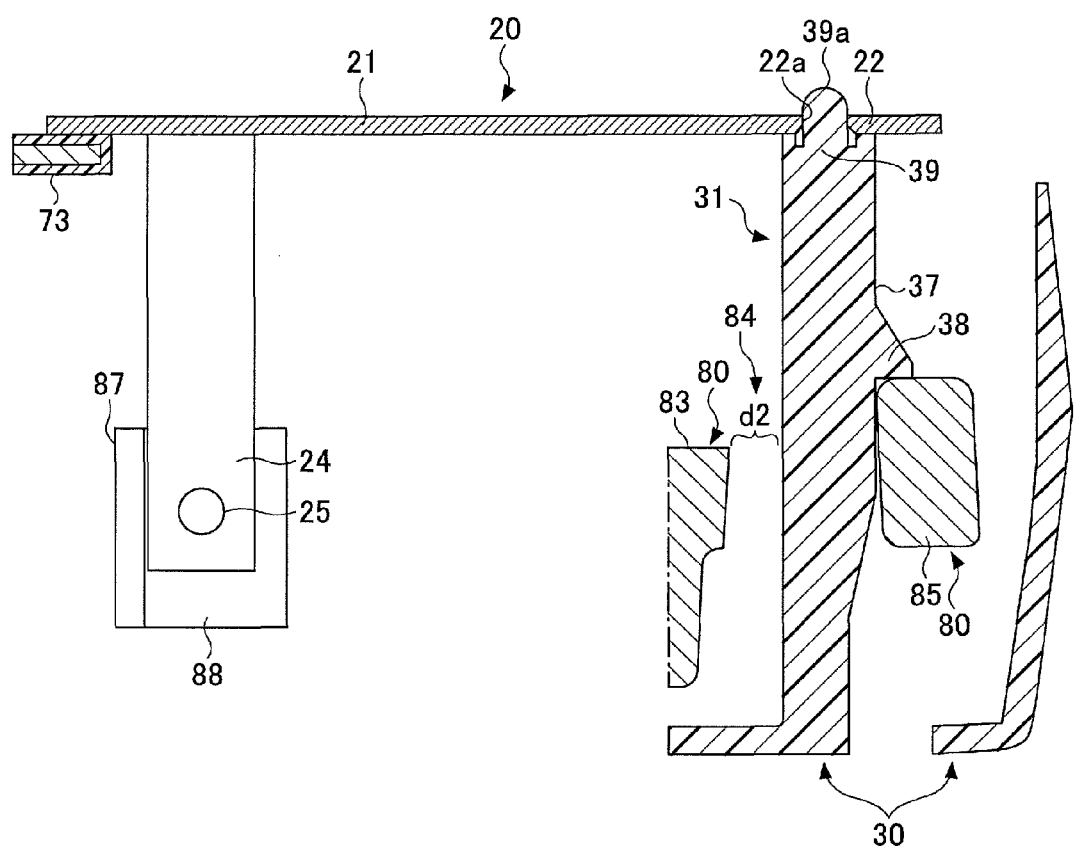
FIG. 13 is a schematic diagram illustrating a positional relationship among a stopper, a gap, and a positioning pin.

FIG. 13 is a schematic diagram illustrating a positional relationship among the first stopper 87, the gap d2, and the positioning pin 31. Even if the horn plate 20 is positioned by the hook 38 relative to the hub 80, the horn plate 20 may move due to the gap d2 when the fixing part 88 and the fixing nut 25 of the fastened part 24 are bolted together with high fastening torque. This is because the positioning pin 31 connected via the frame 21 to the fastened part 24 is able to move a distance corresponding to the gap d2. The first stopper 87 can prevent the movement of the horn plate 20 even when the fixing part 88 and the fastened part 24 are caused to move relative to each other by high fastening torque and a force to rotate the horn plate 20 is applied in a direction to reduce the gap d2.

The first stopper 87 is preferably configured to contact the horn plate 20 and physically stop the movement of the horn plate 20 in order to limit the movement of the horn plate 20. This configuration makes it possible to reliably limit the movement of the horn plate 20 when it is fastened. More preferably, as illustrated in FIGS. 3 and 13, the first stopper 87 may be configured to contact a side surface of the fastened part 24 of the horn plate 3 to physically stop the movement of the fastened part 24 and thereby limit the movement of the horn plate 20.

Also, as illustrated in FIG. 13, the first stopper 87 is preferably disposed on the opposite side of the gap d2 from the positioning pin 31. This configuration makes it possible to more steadily limit the movement of the horn plate 20 even when a force to move the horn plate 20 is applied in a direction to reduce the gap d2. More preferably, as illustrated in FIGS. 1, 4, 5, and 13, the first stopper 87, the gap d2, and the positioning pin 31 may be arranged in a line.

Also, the first stopper 87 is preferably configured to protrude from the fixing part 88. For example, the first stopper 87 is preferably configured to protrude inward in the vehicle width direction from the fixing part 88. This configuration makes it possible to place the first stopper 87 in a position close to a fastening point between the fixing part 88 and the fastened part 24, and thereby makes it possible to improve the accuracy of positioning the horn plate 20 relative to the hub 80.

Also, as illustrated in FIGS. 4, 6, and 8, the hub 80 preferably includes a second stopper 90 that limits the movement of the horn plate 20 in a direction opposite to the direction in which the positioning pin 31 protrudes. The second stopper 90 is a downward movement limiting stopper that, when an excessive force is applied to the horn plate 20 in a direction opposite to the direction in which the positioning pin 31 protrudes, prevents the horn plate 20 from moving downward, i.e., in the opposite direction.

The second stopper 90 makes it possible to prevent the horn plate 20 and the body cover 30 from moving downward even when the horn plate 20 is pressed with an excessive force during, for example, an assembly process, and thereby makes it possible to prevent an excessive force from being applied via the positioning pin 31 to the body cover 30. The second stopper 90 can also prevent an excessive force from being applied via the positioning pin 31 to the body cover 30 when the air bag 11 of the air-bag module 10 is inflated and expanded. Also, even when the positioning pin 31 for positioning the horn plate 20 is comprised of a comparatively soft material such as a thermoplastic resin (e.g., polypropylene (PP)), the hub 80 comprised of a harder material can receive such an excessive force.

As illustrated, for example, in FIG. 8, the second stopper 90 preferably includes a contact surface 91 that faces the positioning pin contact part 22. With this configuration, the second stopper 90 contacts the positioning pin contact part 22 at a position close to the positioning pin 31 and can receive an excessive force from the positioning pin contact part 22. Accordingly, the second stopper 90 can prevent the horn plate 20 from bending due to an excessive force.

Also, as illustrated, for example, in FIG. 8, a clearance d1 (e.g., from 0.2 mm to 1 mm) is preferably provided between the second stopper 90 and the positioning pin contact part 22. Providing the clearance d1 allows the positioning pin contact part 22 to contact the contact surface 91 of the second stopper 90 only when an excessive force is applied to the positioning pin contact part 22, and thereby makes it possible to suppress noise generated due to the contact between the positioning pin contact part 22 and the contact surface 91 in a normal condition.

Also, to suppress generation of noise, a shock absorber, which is made of, for example, a urethane resin, may be provided in the clearance d1. Such a shock absorber may be provided, for example, on at least one of the positioning pin contact part 22 and the contact surface 91 of the second stopper 90.

An air-bag module mounting structure according to embodiments is described above. However, the present invention is not limited to the above described embodiments. Combinations of some or all of the embodiments and variations and modifications of the embodiments may be made without departing from the scope of the present invention.

For example, the air-bag module 10 and the horn plate 20 may be separately attached to the hub 80. Also, the air-bag module 10 and the horn plate 20 may be assembled in advance, and then attached to the hub 80.

The present international application is based on and claims the benefit of priority of Japanese Patent Application No. 2012-200856 filed on Sep. 12, 2012, the entire contents of which are hereby incorporated herein by reference.

EXPLANATION OF REFERENCE NUMERALS

1 Steering device
10 Air-bag module
11 Air bag
12 Inflator
13 Module cover
20 Horn plate (example of holding part)
21 Frame
22 Positioning pin contact part
23 Lower spoke contact part
24 Fastened part
25 Fixing nut
30 Body cover (example of cover part)
31 Positioning pin
32 Bottom part
33 Through hole 34 Right and left side walls
35 Lower side wall
36 Hook
37 Side surface
38 Hook
39 Head
39a Protrusion
40 Steering wheel
50 Rim
51 Core
52 Skin part
60 Horizontal spoke
61 Rim-side base part
62, 63 Connecting part
70 Lower spoke
71 Rim-side base part
72 Connecting part
73 Positioning part
80 Hub
82 Hub body
83 Mounting surface
84 Insertion hole
87 First stopper
88 Fixing part
89 Slot
90 Second stopper

The invention claimed is:

1. An air-bag module mounting structure, comprising:
a steering wheel including a hub disposed inside of an annular rim;
an air-bag module disposed in front of the hub;
a holding part to which the air-bag module is fixed; and
a cover part disposed at the back of the hub, a fixing part of the hub and a fixed part of the holding part being fastened together,
wherein the cover part includes a protruding part protruding toward the hub, a hook protruding from a side surface of the protruding part, and a cover-side connection part formed on a head of the protruding part;
wherein the holding part includes a holding-part-side connection part that is connected to the cover-side connection part; and
wherein the hub includes
an insertion hole into which the protruding part is inserted and with which the hook engages, and
a stopper that prevents the holding part from moving, because of a gap existing between the insertion hole and the protruding part, when the fixing part and the fixed part are fastened together, the gap allowing the protruding part to pass through the insertion hole while the protruding part is bent due to a contact between the hook and the insertion hole.

2. The air-bag module mounting structure as claimed in claim 1, wherein the stopper is disposed on an opposite side of the gap from the protruding part.

3. The air-bag module mounting structure as claimed in claim 1, wherein the stopper protrudes from the fixing part.

4. The air-bag module mounting structure as claimed in claim 1, wherein the hub includes a second stopper that prevents the holding part from moving in a direction opposite to a direction in which the protruding part protrudes.

5. The air-bag module mounting structure as claimed in claim 4, wherein the second stopper is disposed to face the holding-part-side connection part.

6. The air-bag module mounting structure as claimed in claim 5, wherein a clearance is provided between the second stopper and the holding-part-side connection part.

* * * * *